(12) United States Patent
Venaglia et al.

(10) Patent No.: US 10,873,841 B2
(45) Date of Patent: Dec. 22, 2020

(54) DELIVERY OF CONFIGURATION INFORMATION FOR CROSS-PLATFORM APPLICATION INTEGRATION

(71) Applicants: Edward John Venaglia, Portland, OR (US); Murali V. Ponnuraj, Saratoga, CA (US); Alberto Aron Cirilo Racho, Portland, OR (US); Benjamin Gene Cheung, Menlo Park, CA (US)

(72) Inventors: Edward John Venaglia, Portland, OR (US); Murali V. Ponnuraj, Saratoga, CA (US); Alberto Aron Cirilo Racho, Portland, OR (US); Benjamin Gene Cheung, Menlo Park, CA (US)

( * ) Notice: Subject to any disclaimer, the term of this patent is extended or adjusted under 35 U.S.C. 154(b) by 51 days.

(21) Appl. No.: 14/320,627

(22) Filed: Jun. 30, 2014

(65) Prior Publication Data

US 2015/0381403 A1     Dec. 31, 2015

(51) Int. Cl.
*H04W 4/50*        (2018.01)
*H04W 4/21*        (2018.01)

(52) U.S. Cl.
CPC .............. *H04W 4/50* (2018.02); *H04W 4/21* (2018.02)

(58) Field of Classification Search
CPC .... H04L 41/0253; H04L 41/082; H04W 4/50; H04W 4/21
See application file for complete search history.

(56) References Cited

U.S. PATENT DOCUMENTS

| | | | | |
|---|---|---|---|---|
| 9,223,557 | B1 * | 12/2015 | Gigliotti | G06F 8/61 |
| 2008/0189768 | A1 * | 8/2008 | Callahan | H04L 63/105 |
| | | | | 726/4 |
| 2010/0050093 | A1 * | 2/2010 | Behrens | G06Q 10/10 |
| | | | | 715/753 |
| 2011/0022571 | A1 * | 1/2011 | Snyder | G06F 8/62 |
| | | | | 707/692 |
| 2011/0243024 | A1 * | 10/2011 | Osterling | H04L 67/104 |
| | | | | 370/252 |

\* cited by examiner

*Primary Examiner* — Chris Parry
*Assistant Examiner* — Steven C Nguyen

(57) ABSTRACT

A method and a device are disclosed including one or more plug-in or Add-on Software Components (ASC) provided by a Social Business Platform (SBP) to deliver configuration information for the integration of various applications, services, and functionality from other platforms in an integrated environment. Each ASC may deliver a particular type of configuration information usable to configure and/or integrate services from various platforms, the services including data tiles and data streams, storage and document management services, single-function applications, core applications like communication and task management services, and other application-specific add-ons. In various embodiments, the configuration information may be distributed as packages of one or more files, which describe the configuration to be applied to the integrated services. In some embodiments, a global registry may be used to identify and deploy the available add-ons, while in other embodiments, the add-ons may be deployed manually or in other custom manners.

19 Claims, 5 Drawing Sheets

DELIVERY OF CONFIGURATION INFORMATION FOR CROSS-PLATFORM APPLICATION INTEGRATION

TECHNICAL FIELD

This application relates generally to network integration. More specifically, this application relates to integration of applications and services across multiple computer networks.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
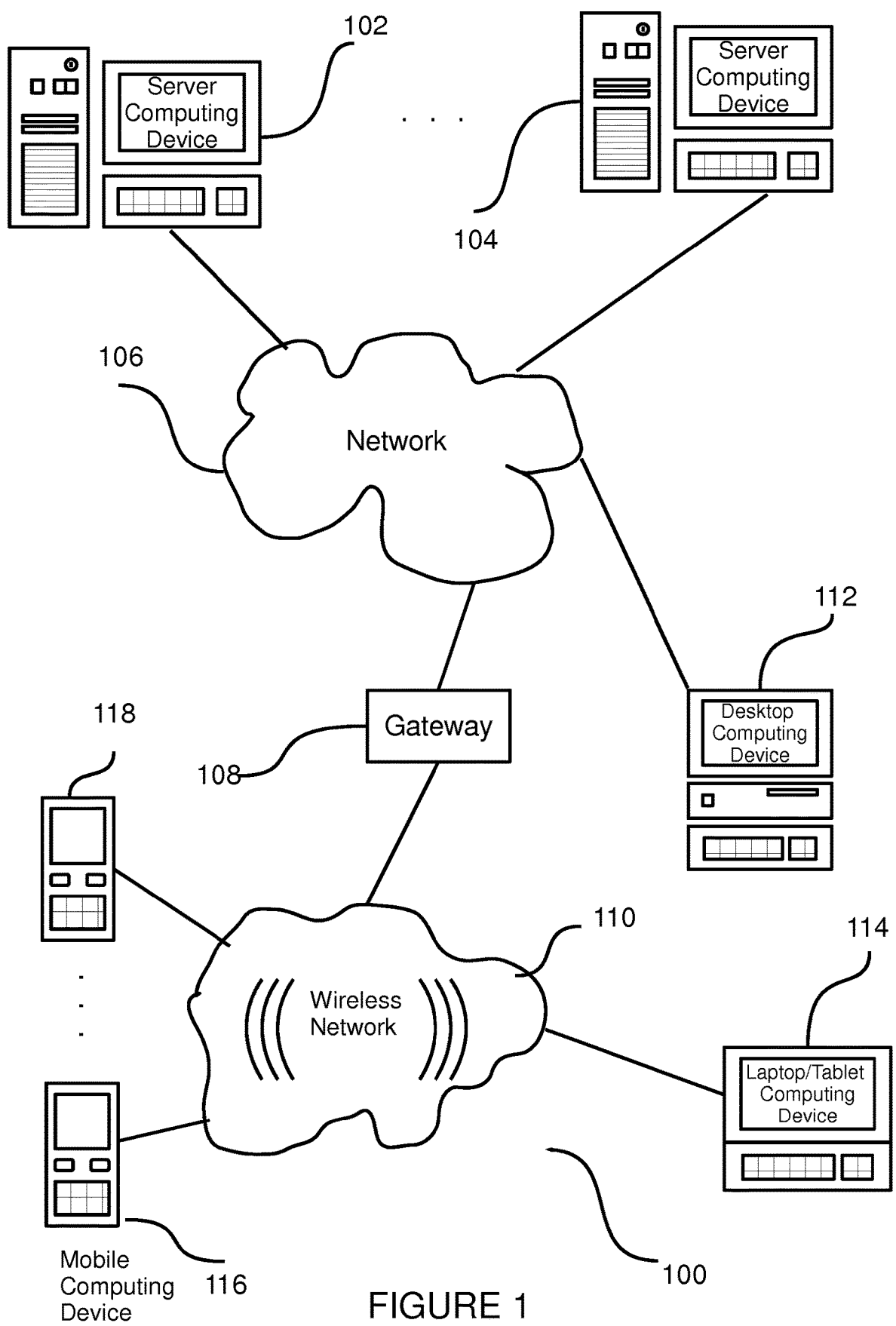
FIG. 1 shows an embodiment of a network computing environment wherein the disclosure may be practiced.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular computing environments such as enterprise and corporate networks, it will be appreciated that the disclosure may be used in other computing environments such as government intranet, personal local area networks, universities, hospitals, and the like.

Briefly described, a system and a method are disclosed including one or more plug-in or Add-on Software Components (ASC) provided by a Social Business Platform (SBP) to deliver configuration information for the integration of various applications, services, and functionality from other platforms at the point of use in an integrated computing environment. In various embodiments, each ASC may deliver a particular type of configuration information usable to configure and/or integrate services from various platforms, the services including data tiles and data streams, storage and document management services, single-function applications, core applications like communication and task management services, and other application-specific add-ons. In various embodiments, the configuration information may be distributed as packages of one or more files, which describe the configuration to be applied to the integrated services. In some embodiments, a global registry may be used to identify and deploy the available add-ons, while in other embodiments, the add-ons may be deployed manually or in other custom manners.

With the ubiquity of computing devices such as laptop computers, computing pads and tablets, and powerful smartphones, among others, and widely available high speed computer networks, communication between large numbers of users is easier than ever. User communications range from work projects to social chats and other exchanges of information. In many personal or professional interactions, specialized software applications may be needed to facilitate the interactions such as voice and text communications, multimedia communications, project collaboration, scheduling, document storage and retrieval, document editing and management, conferencing, search, and the like.

The applications that support user interactions for various purposes often belong to different software suites, different platforms, and different networks. For example, a word processing application used in collaborative editing of a document may belong to a software suit from one provider, while a web search engine may be provided by another provider. Hence, when a user is editing a document in the word processor, if he wants to search for information needed in the document, he has to use another application, such as a web browser, to search for the information. If the web browser or web search engine were combined with the word processor, then the user would be able to efficiently search for the needed information from within the word processing application.

However, integration of multiple software applications has several constraints. One is that the applications are often provided by different unrelated vendors, hence, collaboration between the two vendors may not be possible due to various reasons, such lack of joint projects, technical and legal issues, conflict of interest, cost, and the like. To integrate these applications, software component known as add-ons or plug-ins may be used which add functionality missing from the target applications, as further described below. The Add-on Software Components (ASC) may be local or remote, accessed via computer networks or internet "cloud."

Cloud computing refers to software applications and data that are accessed remotely via the web in contrast to applications residing and accessed locally on a user's computer. Some cloud computing solutions enable users to share and work together on documents while others let users store content and files on a location that is accessible from any computer. The integrated interfaces disclosed herein substantially bring cloud computing functionality into the users' local computer, allowing the user to use local application features while also seamlessly incorporating new web functionality.

Illustrative Operating Environment

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), and any future generation radio access technologies for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
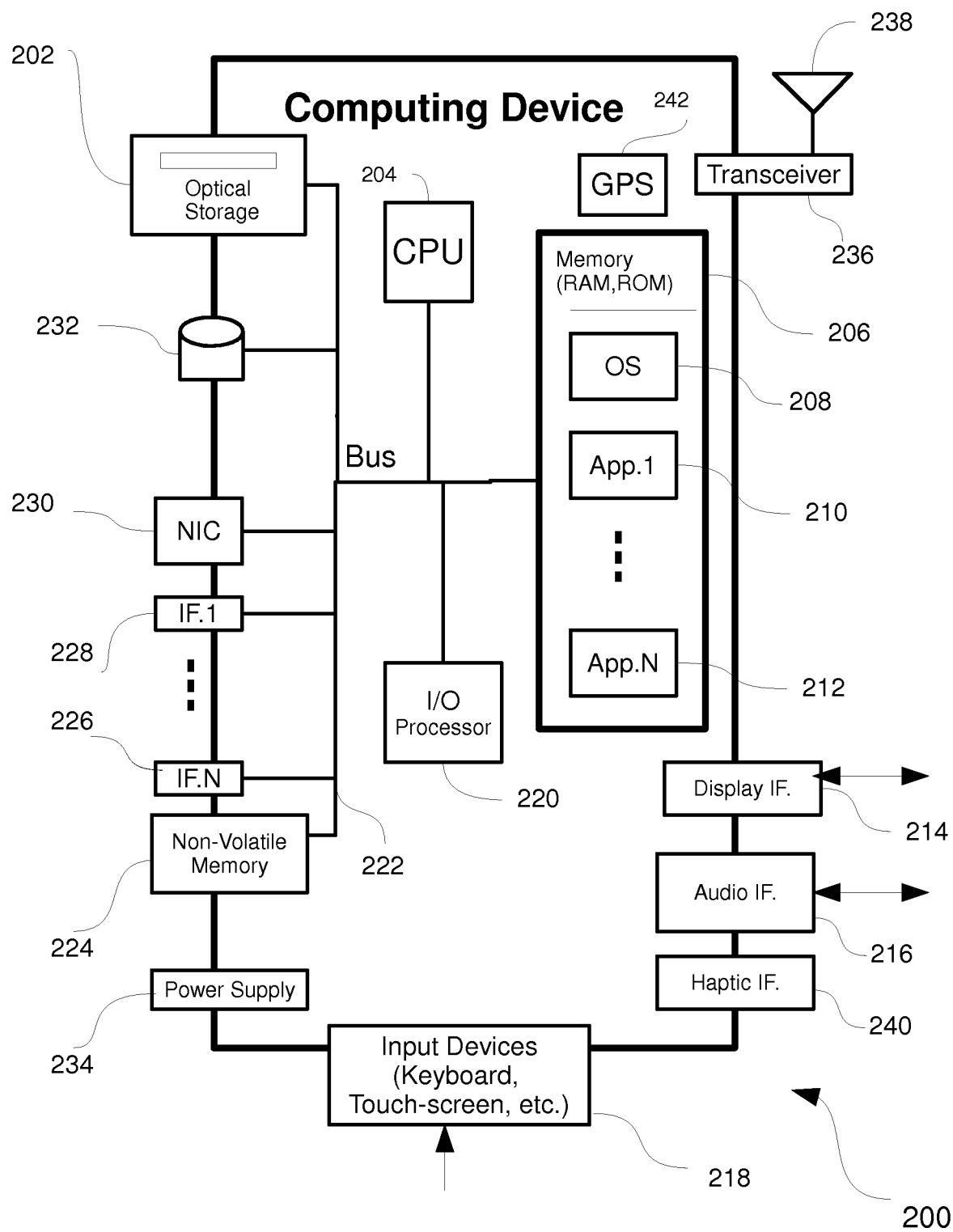
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
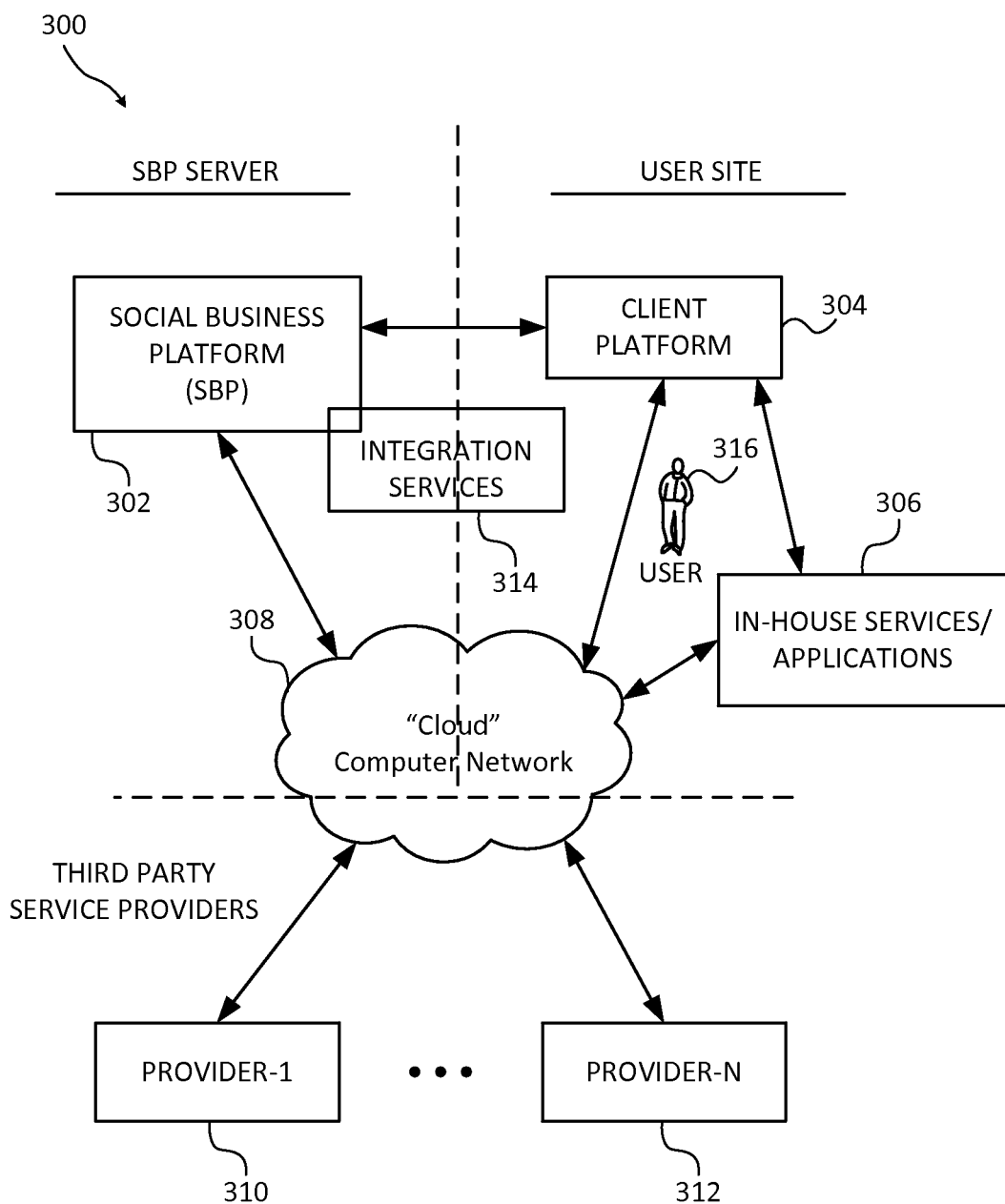
FIG. 3 shows an example cross-platform cloud computing environment configured to deploy multiple diverse applications and services for users.

FIG. 3 shows an example cross-platform cloud computing environment configured to deploy multiple diverse applications and services for users. In various embodiments, cloud computing environment 300 includes Social Business Platform (SBP) 302 associated with integration services 314 and coupled with a computer network or internet cloud 308, client platform 304 associated with user 316 (shown as separated by vertical dotted line from the SBP site servers) and coupled with in-house services and applications 306 and the cloud 308, which is in turn coupled with other third party service providers 310-312 (shown as separated from the SBP site and user site by horizontal dotted lines). The computing platforms and networks shown in FIG. 3 are substantially similar to the networks and include some or all the computing devices discussed with respect to FIGS. 1 and 2.

In various embodiments, SBP 302 includes social network functionalities and facilities applied to a business setting. Generally, a social network is a platform for supporting and building social relationships among individuals with common interests, activities, objectives, and the like. The services offered by a social network have similarities to functions offered by other communication networks such as email accounts, discussion forums, and chat rooms, but they also have important differences. Social networks offer individual-centered services that include a profile of each user, the user's social contacts, and other services. Social networking is generally defined by web-based services that allow individuals to create one or more profiles, to create a list of users with various trust levels, and search and traverse networks of friends and friends of friends to make new connections with new people. Social networks may also provide communication services including email, text messages, instant messaging, private or semi-private (visible to selected friends and contacts only) bulletin boards such as walls in Facebook, and the like.

Social networks may provide various communication tools such as mobile connectivity, picture and video sharing, and blogging. Other services include sharing ideas, pictures, comments, blogs, postings, activity plans, events, and interests with people in their social network. Another service offered by social networks is trust level management between friends or contacts in a social network. Such trust ratings for one user in another user's contact list may be generated based on users' interactions with each other and also with other users in the network, reviews, positions, group status, history, profile, achievements, and the like. A friend with a higher trust level may be given more access to a user's private data and information than one with a lower trust level. Examples of social networks include Facebook, Google+, YouTube, LinkedIn, Instagram, Pinterest, and many others.

In various embodiments, SBP 302 provides some or all of the social network services, such as those discussed above, to a business environment, increasing the efficacy of user interactions. SBP may create a rich communication, information, and collaboration environment in which people in the enterprise have access to deep knowledge about projects, people, and resources. Such environment is different from simple communications and information sharing, such as emails and file servers, respectively.

In various embodiments, SBP provides the depth of information about projects and people using social networking techniques, such as providing personal profiles, pictures, individual contact lists and networks showing who is connected to whom or to what projects, and access to other information. In some respects, SBP is similar to web portals, which provide a variety of information about a variety of subjects, such as news, products, services, communications, search, and the like.

In various embodiments, SBP makes easy group communications, news dissemination, feedbacks, discussions, and other forms of group interaction possible across an enterprise. It further facilitates deep user profiles far beyond the information that can be obtained in a name-and-number directory. Such user profiles may provide user picture, background, skills, project history, organizational positions, reputation, and the like.

In various embodiments, SBP further allows relevant and customized search for a user based on the user's profile, history, needs, position within the enterprise, trust level with regard to projects and information, current active projects, and the like. For example, a user on a particular project searching for a particular skill among other users of the enterprise may find those users who not only have the skills sought but also are available or free to contribute to the particular project. A different user on a different project searching for the same skill may find a different group of users available for the different project.

In various embodiments, SBP may allow better and deeper communications with others through communication statistics, status updates, and other information about particular communications. For example, a user may send an email to a number of recipients. The user may then look at how many of the recipients have opened his email, how long on the average it took them to read it, how many responded, how many opened an attachment to his email, and other similar statistics and information.

In various embodiments, client platform 304 may be any business or other computing and/or networking platform which is coupled with the cloud 308 and with in-house servers to access various business software applications and data. Some of these applications and data may be provided by the in-house servers, while others may be provided by remote third party providers 310-312. Still other services may be provided by SBP 302, which are oriented towards social network services described above. For example, user 316 may be participating in a project, needing the use of various software applications and components such as word processor, email, database, and web search. Generally, each of these applications may be provided from a different source and each one may be an independent application, disjoint from others. Thus, the use of each application entails the a different environment for the user. For example, the user may be writing a paper using the word processor, searching the web for information using a browser with a different interface, and sending emails to other project participants using yet another application with another user interface.

However, if these applications were integrated together in a single computing environment with a single consistent user interface, the efficiency and effectiveness of the user increases because he does not have to constantly move between various disjoint applications and move data between them to perform the various project tasks.

In various embodiments, integration services 314 creates a computing environment in which the various software applications from diverse sources such as SBP, in-house servers, and third party providers may be integrated together and be made accessible in one computing environment to the user. Such integrated computing environment may be created with the use of one or more plug-ins or ASCs. Those skilled in the art will appreciate that the ASC or plug-in component may be implemented as one or more modules, each module providing different functionalities for the plug-in component. Those skilled in the relevant arts will further appreciate that plug-in or add-on components are generally software components that run within another host program to add various capabilities, such as video clip players, encrypting content, messaging, and the like, within the host application originally lacking such capabilities. ASCs are generally not capable to run as independent or standalone programs.

Thus, by plugging in one or more ASCs into a third party application, the functionality of the third party application may be imported and made accessible to the user within the integrated environment. Furthermore, additional functionality may be added by the plugged in ASCs to the third party application. The integration services 314 may be configured to plug in the ASCs into various applications to be integrated, including the SBP native applications as well as third party applications and applications from the user's environment. For example, an ASC that is plugged into a word processor, may allow web search from within the word processor as an added feature. It may further allow the word processor to be loaded into a window within the integrated environment along with other applications that are also loaded within the same integrated environment, all using a common user interface within that environment. In effect, the integrated environment brings the functionalities and services from multiple applications and multiple sources into a single working environment with some common user interface elements.

Plug-in components are useful at least because they may be deployed by third parties onto existing host applications after the release of such applications by their manufacturers. Plug-ins are usually installed by users after installation of the host application, thus the underlying code of the host program is not altered. A host application may generally provide a service interface (or API—Application Programming Interface) for use by plug-in components to register themselves and exchange data with the host application and add functionality to it. Similarly, plug-ins are often installed and used in browsers to provide additional functionality in the browser's environment. Plug-ins may be implemented using DLLs (Dynamic Link Library) which are components that may be dynamically added to a running program and provide various callable functions and capabilities.

Web browser extensions are similar in function to plug-ins and add-ons in that they extend the functionality of a web browser. Extensions may be implemented using HTML, JavaScript, CSS, and the like. Each browser type, such as Internet Explorer, Firefox, Chrome, etc., may provide its own set of APIs to be used by the extensions. However, there are also some web development frameworks, such as the WAF (Web Application Framework), which allows extension developers to build cross-browser extensions using one set of APIs, thus, eliminating the need to develop a different version of the extension for each one of the browser types, such as the examples given above. Depending on the type of application, SBP may use any of the techniques for creating and using add-ons, plug-ins, or extensions for the integration of such applications. So, for web-based applications, SBP may use web browser extensions.

Generally, applications need to be initialized or configured before they can be used. The configuration of applications integrated with an instance of SBP and also the services offered by SBP natively, may entail the setting of various parameters to predetermined states assigning predetermined values or options to particular parameters, setting communication protocol parameters, setting paths for initialization data file paths, setting authorization and/or authentication credentials, selecting protocol options, and the like. Software and/or application configuration may also include changing or updating some of the code base of the application by patching. Software patching may be used to improve software performance or fix software bugs. Software patches may be supplied in the form of a "binary executable", which will modify the binary files that make up the software program being patched.

In various embodiments, the information needed to configure one or more applications in an integrated set of applications may be loaded in a configuration package as one or more files using various specification languages and scripts, such as JSON (JavaScript Object Notation), to specify the configurations to be performed. In some embodiments, the configuration package includes definitions and meta data. The configuration data may include localization and internationalization, authorization and/or authentication credential data, and the like. The configuration data are generally encrypted using various techniques known to those skilled in the art, such as shared private key protocols, to guard the security and integrity of the configuration data and process. Digital certificates or other methods may be used for authentication of data sources during installation and configuration.

In various embodiments, add-ons are distributed as packages, which may be implemented as zip files in some embodiments. The zip file package may contain two JSON configuration files, one including meta data that describes the add-on, and another file including data that describes the configuration to be applied to SBP instance and the applications and services integrated with the SBP instance. The configuration package also may contain images, icons, HTML, and internationalization resources. Add-on packages may be distributed in at least two ways, via a global registry—a service that stores and lists add-ons (further described below with respect to FIG. 5), and manually via which professional service providers may provide a custom add-on package to be uploaded directly.

In various embodiments, Application Programming Interface (API) provided by SBP and installed on other platforms such as the user platform 304 or third party platforms, allows further communications between SBP and the other platforms. Such API may be implemented in part or in entirety by ASCs plugged into the third party platforms for this purpose. Later during configuration of integrated services and applications, executable code from SBP may initiate communications and handshaking with the installed API to configure the applications and/or services.

Figure 4:
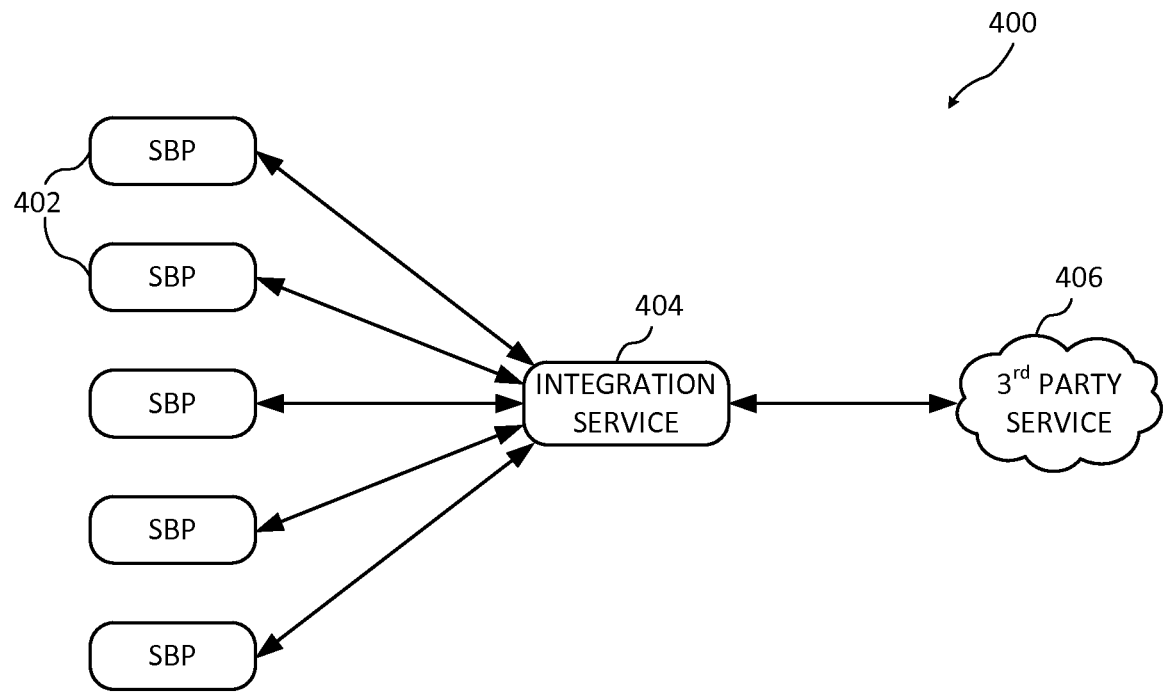
FIG. 4 shows example multiple instances of Social Business Platforms (SBP) integrated with third party services via an integration service.

FIG. 4 shows example multiple instances of Social Business Platforms (SBP) integrated with third party services via an integration service. In various embodiments, in a user environment 400, multiple instances of SBP 402 may be created, each interacting with integration service 404 and/or third party service providers 406, as described above with respect to FIG. 3.

In various embodiments, multiple SBP instances may be created to allow using a different configuration for each or use each instance for a different group or project within an enterprise. Each instance of the SBP may interact with the integration service 404 to allow custom configurations for the applications integrated with SBP services. In some embodiments, the integration services and the third party services may be the same, while in other embodiments, they are distinct entities.

Figure 5:
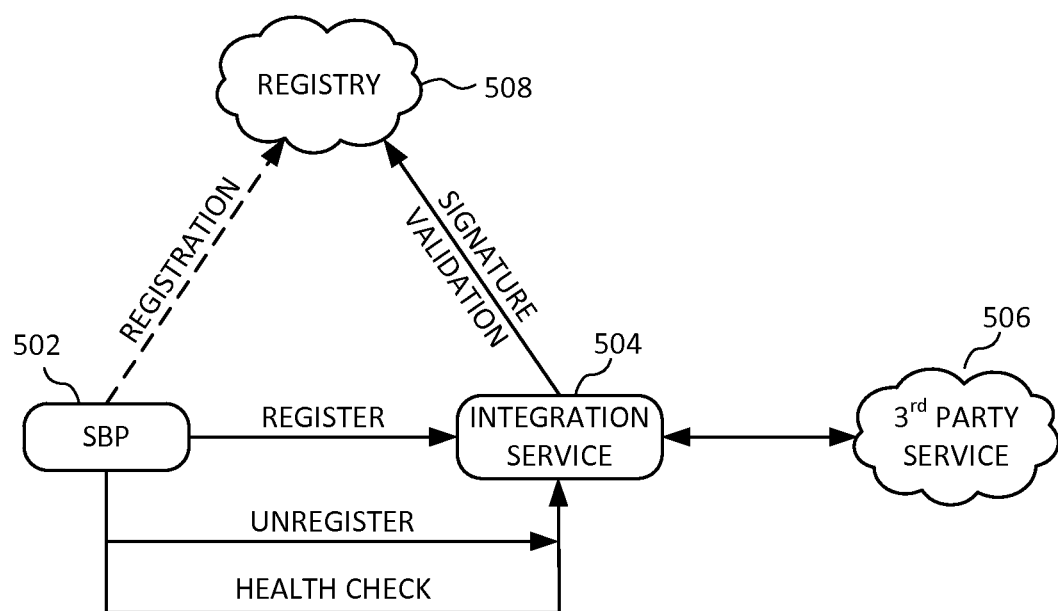
FIG. 5 shows an example instance of a Social Business Platforms (SBP) integrated with third party services via an integration service and a registry service.

FIG. 5 shows an example instance of a Social Business Platforms (SBP) integrated with third party services via an integration service and a registry service. In various embodiments, installation environment 500 may allow registration of one or more SBP 502 instances with a global registry 508 to allow authentication of SBP as a genuine instance. Validation information may be shared with integration service 504 and third party service provider 506.

In various embodiments, When an add-on is installed, the cloud or network service supporting the installation may require an initial handshake. This is commonly referred to as the "register" call. This handshake includes enough information to obtain long-lived standard OAuth credentials, the URL and unique ID of the SBP instance on which the add-on was installed, and a protocol to validate that the call originated from a genuine SBP instance. If this call fails, SBP may retry a preset number of times before declaring a failure to install error. OAuth is an authorization method of providing credentials without exposing the actual user data. For example, through OAuth, a user can allow a remote application to use his username and password to an account without exposing his actual username or password. The OAuth 2.0 authorization framework enables a third-party application to obtain limited access to an HTTP service, either on behalf of a resource owner by orchestrating an approval interaction between the resource owner and the HTTP service, or by allowing the third-party application to obtain access on its own behalf.

In various embodiments, when an add-on is uninstalled, an "unregister" call may be made to inform the cloud or network service that supports the un-installation. This call has a similar payload as the register call.

In some embodiments, an add-on may supply a URL used to check the health of the integration service and/or the related service(s) upon which it depends. This "health check" call may be computationally expensive for the cloud service to execute, so it is seldom called on a regular interval. The result of the health check is specific to the integration service being queried. The integration service may also suggest corrective actions or additional steps.

In various embodiments, the global registry 508 service provides APIs to publish, download and list add-ons available to install, given a particular version of SBP. The global registry may need the SBP instance to go through a one-time hand-shake securely in order to establish a relationship by sharing confidential information so that it can authenticate calls from SBP and permit downloading add-on packages.

In various embodiments, add-ons installed from the global registry may be updated automatically by the global registry if a newer version of the same add-ons become available. If a new version of the same add-on is published, instances of the SBP with an older version of the add-on installed may be able to download and install the newer version of the add-on, without user intervention.

Figure 6:
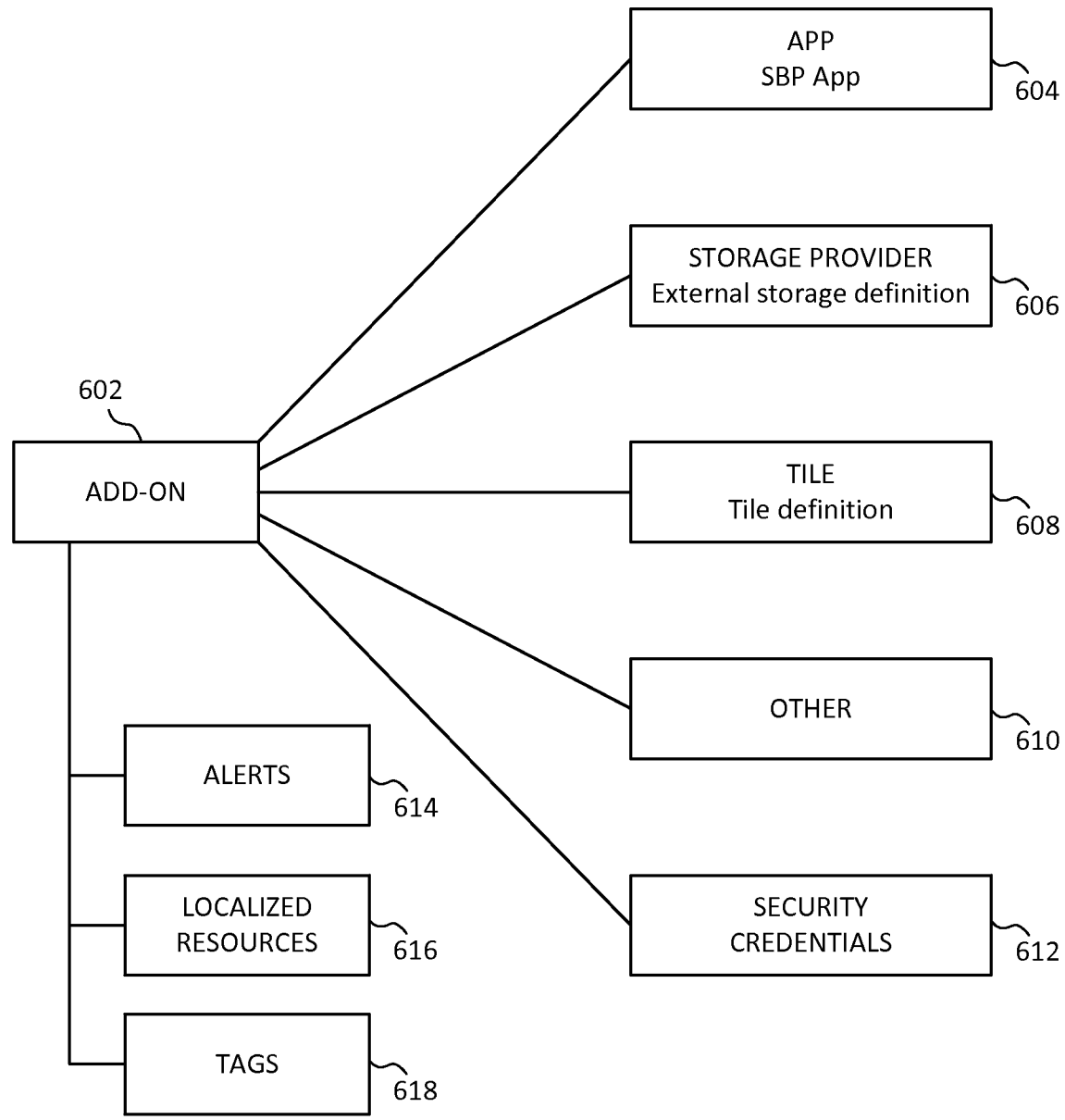
FIG. 6 shows a diagram depicting example types of plug-in or Add-on Software Components (ASC) usable for integration of services across diverse platforms.

FIG. 6 shows a diagram depicting example types of plug-in or Add-on Software Components (ASC) usable for integration of services across diverse platforms. In various embodiments, ASCs may be classified according to their functions and/or applications in which they are used. A few non-exhaustive types of ASCs are described below. Those skilled in the art will appreciate that many other ASC types are possible without departing from the spirit of the present disclosures.

In various embodiments, one ASC type may be used for each type of native SBP application configuration. For example, an ASC for an email account may be made to configure user email options preferences, such as viewing pane or font, for the email application, while an ASC for a search application may be made to configure user search result preferences, such as number of results shown per page.

Another ASC type may be used to configure storage provider applications, such as DropBox, Box, and Microsoft SharePoint.

Another ASC type may be used to configure tiles. A tile is usually an active relatively small graphical component and/or user interface, such as an applet or small software application, which displays sample graphical or visual information related to bigger bodies of information associated with software applications the tiles represent. When selected, tiles display more complete information, such as file or web page contents, related to the sample information; launch their respective associated applications; or bring them to the forefront of the display and assume focus for the user's input actions. For example, a tile representing an email application may show some information about the email inbox such as number of new messages, fragments of the most recent message, and the like. As another example, a tile representing a message, may display an image of the sender and overlay some text from the message, such as its subject line.

Another type of ASC may for security credentials. Such ASCs may use OAuth or other techniques to manage confidential credential data.

Another type of ASC may be used to handle alerts issued by the SBP instance.

Another ASC type may be used to localize resources. Localization may include language, logo, color scheme, sounds, fonts, and the like.

Another ASC type may be used to manage tags associated with various applications or functions for search purposes.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. An integrated computing system comprising:
   one or more processors;
   one or more memory units coupled with the one or more processors;
   multiple Social Business Platforms (SBPs) having Add-on Software Components (ASCs) downloaded from a global registry, distinct from the SBPs, that when loaded into the one or more memory units and executed on the one or more processors deliver configuration information and configures applications from diverse sources and services in accordance with the configuration information to work with the SBPs; and
   an integration service associated with the SBPs to plug in the ASCs into the applications and the SBPs to create a computing environment that integrates the applications, services, and SBPs into an integrated computing environment having a single user interface to the applications and to each of the SBPs that is accessible to a client platform integrated with the SBPs to use the services by the SBPs.

2. The integrated computing system of claim 1, wherein applications and services provided by the SBPs and the client platform are integrated with applications and services provided by remote third party providers.

3. The integrated computing system of claim 1, wherein the SBPs are configured to provide social networking services including at least one of user profiles, user pictures, user social contacts, and contact search functions configured to connect with social contacts of other users.

4. The integrated computing system of claim 1, wherein the SBPs are configured to assign a trust level to each of social contacts of a user.

5. The integrated computing system of claim 1, wherein the applications and services are associated with at least one of the client platform applications and third-party service providers' applications and services.

6. The integrated computing system of claim 1, wherein the ASCs include one of a plug-in and a browser extension component.

7. The integrated computing system of claim 1, wherein the ASCs are provided by sources unassociated with sources providing the applications and services.

8. The integrated computing system of claim 1, wherein the ASCs are listed, published, and stored by the global registry.

9. The integrated computing system of claim 8, wherein the global registry is configured to register instances of the SBPs to authenticate the SBPs.

10. The integrated computing system of claim 1, wherein each ASC is a type configured to serve at least one of SBP application, storage facility, data tile, security credentials, alerts, localized resources, and search tags.

11. A computing system comprising:
a processor;
a memory unit coupled with the processor;
a registry service providing Add-on Software Components (ASCs) that when stored in the memory unit and executed on the processor deliver configuration information to configure a plurality of applications and services from unrelated sources in accordance with the configuration information to integrate with Social Business Platforms (SBPs);
an integration service associated with the SBPs to plug in the ASCs into the applications and the SBPs to integrate the applications, services, and SBPs within an integrated computing environment; and
a client platform integrated with the SBPs to use the integrated computer environment including the applications, services, and the SBPs, wherein the integrated computing environment provided by the integration service provides a single user interface to the applications and to each of the SBPs for the client platform.

12. The computing system of claim 11, wherein the registry is a global registry configured to authenticate an instance of the SBPs at the time of installation of an ASC.

13. The computing system of claim 11, wherein the registry is configured to publish a list of available ASCs via the registry.

14. The computing system of claim 11, wherein the registry is configured to unregister when an ASC is uninstalled by the SBPs.

15. The computing system of claim 11, wherein the registry is configured to update some of the ASCs available from the registry, to allow the SBPs to download and install the updated ASC from the registry.

16. A computer-implemented method of configuring applications, the method comprising:
accessing Add-on Software Components (ASCs) from a global registry, distinct from Social Business Platforms (SBPs);
executing the ASCs to deliver application configuration information;
configuring the plurality of the applications from diverse sources and services with the ASCs in accordance with the delivered application configuration information;
using an integration service associated with the SBPs to plug in the ASCs into the applications and the SBPs to create a computing environment that integrates the applications, services, and SBPs into an integrated computing environment having a single user interface to the applications and to each of the SBPs that is accessible to a client platform integrated with the SBPs to use the services by the SBPs.

17. The method of claim 16, further comprising registering the SBPs with the global registry to access the ASCs.

18. The method of claim 16, wherein each ASC is a type configured to serve at least one of SBP application, storage facility, data tile, security credentials, alerts, localized resources, and search tags.

19. The method of claim 16, wherein the ASCs include one of a plug-in and a browser extension component.

* * * * *